US012812410B2

(12) United States Patent
Dimov et al.

(10) Patent No.: US 12,812,410 B2
(45) Date of Patent: Nov. 24, 2026

(54) LOCALIZATION OF WIRELESS EQUIPMENT BASED ON NETWORK USAGE DATA

(71) Applicant: Boost SubscriberCo L.L.C., Englewood, CA (US)

(72) Inventors: Dmitry Dimov, San Francisco, CA (US); Mikhail Leonidovich Arbuzov, Santa Clara, CA (US); Sisong Bei, Dublin, CA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 302 days.

(21) Appl. No.: 18/399,201

(22) Filed: Dec. 28, 2023

(65) Prior Publication Data

US 2025/0220456 A1 Jul. 3, 2025

(51) Int. Cl.
*H04W 24/02* (2009.01)
*H04W 16/18* (2009.01)
*H04W 24/08* (2009.01)

(52) U.S. Cl.
CPC ........... *H04W 24/02* (2013.01); *H04W 16/18* (2013.01); *H04W 24/08* (2013.01)

(58) Field of Classification Search
None
See application file for complete search history.

(56) References Cited

U.S. PATENT DOCUMENTS 6,917,816 B2 7/2005 Abed et al.
7,043,501 B2 5/2006 Schiller
7,526,434 B2 4/2009 Sharp
7,680,859 B2 3/2010 Schiller
8,019,352 B2 9/2011 Rappaport
8,355,945 B1 1/2013 Lall et al.
(Continued)

FOREIGN PATENT DOCUMENTS

EP 3046289 B1 12/2017
WO 2016/183302 A1 11/2016
(Continued)

OTHER PUBLICATIONS

U.S. Appl. No. 18/533,045, Rehiman et al., Dec. 7, 2023.
(Continued)

*Primary Examiner* — Andre Tacdiran
(74) *Attorney, Agent, or Firm* — Lowenstein Sandler LLP

(57) ABSTRACT

A method includes receiving first data indicative of network usage of multiple users of a wireless network and receiving second data indicative of one or more locations of a set of wireless cells. The first data includes information representing sequences of wireless cells that are connected to by user devices of the multiple users. The method also includes identifying, using one or more machine learning models, a portion of the one or more locations that are likely to be incorrect based on the first data and the second data. The method also includes generating estimates of a revised location for each wireless cell corresponding to the identified portion of the one or more locations that are likely to be incorrect, wherein the estimates are generated by one or more additional machine learning models. The method also includes updating the second data to include the generated estimates.

11 Claims, 6 Drawing Sheets

(56) References Cited

U.S. PATENT DOCUMENTS

| | | | | |
|---|---|---|---|---|
| 8,376,755 | B2 | 2/2013 | Schiller | |
| 8,645,187 | B1 | 2/2014 | Harris et al. | |
| 11,074,598 | B1 | 7/2021 | Kumar et al. | |
| 2009/0292583 | A1 | 11/2009 | Eilam et al. | |
| 2012/0295641 | A1* | 11/2012 | Tsuda | H04W 64/00 455/456.6 |
| 2013/0054306 | A1 | 2/2013 | Bhalla et al. | |
| 2014/0156483 | A1 | 6/2014 | Egner et al. | |
| 2014/0274077 | A1* | 9/2014 | Ramanan | H04W 16/18 455/446 |
| 2016/0021503 | A1 | 1/2016 | Tapia | |
| 2016/0192316 | A1* | 6/2016 | Collet | H04W 8/24 455/456.1 |
| 2016/0247173 | A1 | 8/2016 | Manoharan et al. | |
| 2016/0316341 | A1 | 10/2016 | Vaccari et al. | |
| 2016/0366565 | A1 | 12/2016 | Fjelberg et al. | |
| 2017/0201850 | A1 | 7/2017 | Raleigh et al. | |
| 2019/0043068 | A1 | 2/2019 | Livne et al. | |
| 2019/0297487 | A1 | 9/2019 | Muñoz Sanchez | |
| 2020/0234365 | A1 | 7/2020 | Friedman | |
| 2020/0273050 | A1 | 8/2020 | Doherty | |
| 2021/0014698 | A1 | 1/2021 | Meier-Hellstern | |
| 2021/0029690 | A1 | 1/2021 | Hassan et al. | |
| 2021/0211900 | A1 | 7/2021 | Pius | |
| 2021/0281336 | A1 | 9/2021 | Upadhya et al. | |
| 2021/0350395 | A1 | 11/2021 | Dorele | |
| 2021/0352609 | A1 | 11/2021 | Kiefer et al. | |
| 2021/0377905 | A1* | 12/2021 | Chen | H04W 56/0045 |
| 2021/0410035 | A1 | 12/2021 | Yang et al. | |
| 2022/0369067 | A1 | 11/2022 | Chen et al. | |
| 2022/0405775 | A1 | 12/2022 | Siebel | |
| 2023/0059853 | A1 | 2/2023 | Chirkin | |
| 2023/0105365 | A1 | 4/2023 | Jung | |
| 2023/0141593 | A1 | 5/2023 | Ramer | |
| 2023/0275973 | A1 | 8/2023 | Sakamoto | |
| 2023/0337009 | A1 | 10/2023 | Costa et al. | |
| 2023/0419277 | A1 | 12/2023 | Cella et al. | |
| 2024/0147250 | A1* | 5/2024 | Young | H04W 16/18 |
| 2024/0323906 | A1 | 9/2024 | Bhorkar et al. | |
| 2025/0061350 | A1 | 2/2025 | Krishnan et al. | |
| 2025/0191004 | A1 | 6/2025 | Rehiman et al. | |
| 2025/0191005 | A1 | 6/2025 | Rehiman et al. | |
| 2025/0191010 | A1 | 6/2025 | Rehiman et al. | |
| 2025/0191011 | A1 | 6/2025 | Rehiman et al. | |
| 2026/0056277 | A1* | 2/2026 | Thomas | G01S 5/0263 |

FOREIGN PATENT DOCUMENTS

| | | | |
|---|---|---|---|
| WO | 2020/136512 | A1 | 7/2020 |
| WO | 2022/010791 | A1 | 1/2022 |
| WO | 2024/074189 | A1 | 4/2024 |

OTHER PUBLICATIONS

U.S. Appl. No. 18/533,051, Rehiman et al., Dec. 7, 2023.
U.S. Appl. No. 18/533,057, Rehiman et al., Dec. 7, 2023.
U.S. Appl. No. 18/533,070, Rehiman et al., Dec. 7, 2023.
Bansal et al., “Missing Value Imputation on Multidimensional Time Series,” CoRR, Submitted on Jun. 2023, arVix:2103.01600, 13 pages.
neighborhoodscout.com [online], “Match My Neighborhood,” available on or before Dec. 8, 2019, via Internet Archive: Wayback Machine URL <https://web.archive.org/web/20191208221052/https://www.neighborhoodscout.com/match>, retrieved on Mar. 19, 2024, URL <https://www.neighborhoodscout.com/match>, 1 page.
opencellid.com [online], “The world’s largest Open Database of Cell Towers,” available on or before Mar. 8, 2024, via Internet Archive: Wayback Machine URL <https://web.archive.org/web/20240308191733/https://opencellid.org/#zoom=16&lat=37.77889&Ion=-122.41942>, retrieved on Mar. 27, 2024, URL <https://opencellid.org/#zoom=16&lat=37.77889&Ion=-122.41942>, 3 pages.
techcrunch.com [online], “A ‘Stripe for phone plans’: Gigs raises $20M to help any company be an MVNO,” available on or before Sep. 21, 2022, via Internet Archive: Wayback Machine URL <https://web.archive.org/web/20220921133236/https://techcrunch.com/2022/09/21/a-stripe-for-phone-plans-gigs-raises-20m-to-help-any-company-be-an-mvno/>, retrieved on Mar. 19, 2024, URL <https://techcrunch.com/2022/09/21/a-stripe-for-phone-plans-gigs-raises-20m-to-help-any-company-be-an-mvno/>, 10 pages.
Zhao et al., “Uplift Modeling for Multiple Treatments with Cost Optimization,” CoRR, Submitted on Mar. 2020, arVix:1908.05372, 10 pages.
Latvaitis, “Churn Prediction in Telecommunication Industry Using Machine Learning,” Thesis for the degree of Master of Mathematics and Informatics, Vilnius University, 2022, 23 pages.
Vafeiadis et al., “A Comparison of machine learning techniques for customer churn prediction,” Simulation Modelling Practice and Theory, Jun. 2015, 55:1-9.
Wilson et al., “Real World Applications of Machine Learning Techniques over Large Mobile Subscriber Datasets,” CoRR, Submitted on Feb. 2015, arXiv:1502.02215v1, 9 pages.
Zoric “Predicting Customer Churn in Banking Industry using neural Networks,” Interdisciplinary Description of Complex Systems: INDECS, Mar. 2016, 14(2):116-124.
IP.com Search History, 2025, 126 pages.
Salau et al., Machine Learning Analysis of Multi-Radio Access Technology Selection in 5G NSA Network, 2023, 6 pages.

* cited by examiner

200

| | Session 1 | Session 2 | Session 3 | Session 4 | . . . |
|---|---|---|---|---|---|
| Cell IDs | | | | | |
| Time Between Connections | | | | | |
| Distance Between Cells | | | | | |
| . . . | | | | | |

FIG. 2

300

| | Latitude | Longitude | . . . |
|---|---|---|---|
| Cell ID 1 | | | |
| Cell ID 2 | | | |
| Cell ID 3 | | | |
| Cell ID 4 | | | |
| . . . | | | |

FIG. 3

LOCALIZATION OF WIRELESS EQUIPMENT BASED ON NETWORK USAGE DATA

TECHNICAL FIELD

This disclosure generally relates to machine learning-based techniques for (i) identifying when an alleged location of wireless equipment (e.g., a cell installed at a wireless tower) is likely to be incorrect, and (ii) estimating the location of wireless equipment based on network usage data from multiple users of a cellular network (e.g., a 4G network or a 5G network).

BACKGROUND

Cellular networks (e.g., cellular radio access networks, cellular core networks, etc.) are telecommunications networks that include a number of distributed devices that send, receive, and/or process wireless signals across the network to provide coverage to a geographical area. For example, in 5G networks, these devices can include wireless equipment called "wireless cells," "small cells," or "cells," which can be installed at wireless towers distributed throughout the geographic area. Users (e.g., wireless customers, wireless subscribers, roaming users, etc.) can connect user devices to these cells in order to access the network, and they often pay a provider of the cellular network (e.g., in accordance with a data plan or contract) to use a certain amount data (including unlimited data) on the network.

SUMMARY

This document describes techniques for processing data about the use of a cellular network by various users to (i) identify when an alleged location of wireless equipment (e.g., a cell) is likely to be incorrect and (ii) estimate the location of wireless equipment. Such techniques can be important to improve the quality of datasets that contain location-related information about wireless equipment in the cellular network. These improved datasets can be used to derive valuable location-related data insights such as demographic information about users of the cellular network, primary work locations for the users, primary residence locations for the users, etc. In turn, these data insights can be used for various practical applications (e.g., by a cellular network provider) including estimating customer payments for individual customers of the cellular network provider, estimating customer churn probabilities, estimating customer lifetime value (e.g., a metric of profitability over a customer's lifetime), deciding where to install wireless equipment, and deciding where to establish new retail locations (e.g., locations where data plans are sold).

When users of a cellular network (e.g., wireless customers, wireless subscribers, roaming users, pre-paid users, etc.) connect user devices to the cellular network, data about the users' network usage can be collected. For example, this data can be collected in the form of "session-level data" that includes information about various instances, or "sessions", in which a user device connects to the cellular network. The collected information can include features such as identifiers for one or more cells that the user device connects to (e.g., "cell IDs"), the time between connections, the alleged coordinates of the cells, the distance between cells that the user device connects to, the technology used, an amount of data transmitted during the session, a session cancelation reason (if applicable), incoming or outgoing calls and/or messages, etc. In some cases, the collected data can be viewed or otherwise accessed by one or more parties such as a cellular network provider.

Although the collected session-level data can be indicative of the cells that a particular user connects to (e.g., via their user device), in some cases, a party accessing the data (e.g., a cellular network provider) may not have personal knowledge of where the cells are located or even who the user is (e.g., in the case of users on pre-paid data plans who insert a pre-paid SIM card into their user device). In such cases, the party accessing the data might cross-reference an identifier of the cells (e.g., a cell ID) from the session-level data with datasets that map wireless equipment (such as cells) with their corresponding locations (e.g., a latitude and longitude). One example of such a dataset is "OpenCelliD", which is a crowdsourced dataset available at https://opencellid.org. However, the alleged locations in such datasets might not always be accurate due to, e.g., data write-in issues, misuse of software that generates the datasets, software bugs, hardware issues, hardware positioning, etc. Further, the datasets may not be complete, and for some cells, the dataset might not include any alleged locations for the cells. Thus, it can be desirable to develop techniques, such as those described herein, for identifying when an alleged location of wireless equipment (e.g., a cell) is likely to be incorrect and (ii) estimating the location of wireless equipment (e.g., in cases where no alleged location is provided or when the alleged location is likely to be incorrect).

In one aspect, a method is featured. The method includes receiving first data indicative of network usage of multiple users of a wireless network, wherein the first data includes information representing sequences of wireless cells that are connected to by user devices of the multiple users. The method also includes receiving second data indicative of one or more locations of a set of wireless cells, the set of wireless cells including at least a portion of the wireless cells that are connected to by the user devices of the multiple users. The method also includes identifying, using one or more machine learning models, a portion of the one or more locations that are likely to be incorrect based on the first data and the second data. The method also includes generating estimates of a revised location for each wireless cell corresponding to the identified portion of the one or more locations that are likely to be incorrect, wherein the estimates are generated by one or more additional machine learning models. The method also includes updating the second data to include the generated estimates.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the one or more additional machine learning models can include a neural network trained using examples of wireless cell locations with artificially introduced noise. In some implementations, the one or more machine learning models can be trained to perform a classification task and the one or more additional machine learning models can be trained to perform a regression task. In some implementations, the method can include determining a primary work location or a primary residence location for at least one of the multiple users based on the first data and the updated second data. In some implementations, the method can include attributing demographic information to at least one of the multiple users based on the first data, the updated second data, and demographic information known about one or more geographic locations. In some implementations, the method can include estimating, based on the first data and the updated second data, a metric indicative of expected profits to be realized by a provider of the wireless network, the expected profits associated with at least one of the multiple users. In some implementations, the method can include selecting, based on the first data and the updated second data, (i) a candidate location for a retail location or (ii) a candidate location for wireless network infrastructure.

In another aspect, another method is featured. The method includes receiving first data indicative of network usage of multiple users of a wireless network, wherein the first data includes information representing sequences of wireless cells that are connected to by user devices of the multiple users. The method also includes receiving second data indicative of one or more locations of a set of wireless cells, the set of wireless cells including at least a portion of the wireless cells that are connected to by the user devices of the multiple users. The method also includes identifying at least one wireless cell that is represented in the first data but does not have a corresponding location included in the second data, and generating, by one or more machine learning models, an estimated location for the at least one wireless cell. The method also includes updating the second data to include the estimated location.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the method can include determining a primary work location or a primary residence location for at least one of the multiple users based on the first data and the updated second data. In some implementations, the method can include attributing demographic information to at least one of the multiple users based on the first data, the updated second data, and demographic information known about one or more geographic locations. In some implementations, the method can include estimating, based on the first data and the updated second data, a metric indicative of expected profits to be realized by a provider of the wireless network, the expected profits associated with at least one of the multiple users. In some implementations, the method can include selecting, based on the first data and the updated second data, (i) a candidate location for a retail location or (ii) a candidate location for wireless network infrastructure.

In another aspect, a computing system is featured. The computing system includes a memory configured to store instructions and one or more processors configured to execute the instructions to perform operations. The operations include receiving first data indicative of network usage of multiple users of a wireless network, wherein the first data includes information representing sequences of wireless cells that are connected to by user devices of the multiple users. The operations also include receiving second data indicative of one or more locations of a set of wireless cells, the set of wireless cells including at least a portion of the wireless cells that are connected to by the user devices of the multiple users. The operations also include identifying, using one or more machine learning models, a portion of the one or more locations that are likely to be incorrect based on the first data and the second data. The operations also include generating estimates of a revised location for each wireless cell corresponding to the identified portion of the one or more locations that are likely to be incorrect, wherein the estimates are generated by one or more additional machine learning models. The operations also include updating the second data to include the generated estimates.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the one or more additional machine learning models can include a neural network trained using examples of wireless cell locations with artificially introduced noise. In some implementations, the one or more machine learning models can be trained to perform a classification task and the one or more additional machine learning models can be trained to perform a regression task. In some implementations, the operations can include determining a primary work location or a primary residence location for at least one of the multiple users based on the first data and the updated second data. In some implementations, the operations can include attributing demographic information to at least one of the multiple users based on the first data, the updated second data, and demographic information known about one or more geographic locations. In some implementations, the operations can include estimating, based on the first data and the updated second data, a metric indicative of expected profits to be realized by a provider of the wireless network, the expected profits associated with at least one of the multiple users. In some implementations, the operations can include selecting, based on the first data and the updated second data, (i) a candidate location for a retail location or (ii) a candidate location for wireless network infrastructure.

In another aspect, another computing system is featured. The computing system includes a memory configured to store instructions and one or more processors configured to execute the instructions to perform operations. The operations include receiving first data indicative of network usage of multiple users of a wireless network, wherein the first data includes information representing sequences of wireless cells that are connected to by user devices of the multiple users. The operations also include receiving second data indicative of one or more locations of a set of wireless cells, the set of wireless cells including at least a portion of the wireless cells that are connected to by the user devices of the multiple users. The operations also include identifying at least one wireless cell that is represented in the first data but does not have a corresponding location included in the second data, and generating, by one or more machine learning models, an estimated location for the at least one wireless cell. The operations also include updating the second data to include the estimated location.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the operations can include determining a primary work location or a primary residence location for at least one of the multiple users based on the first data and the updated second data. In some implementations, the operations can include attributing demographic information to at least one of the multiple users based on the first data, the updated second data, and demographic information known about one or more geographic locations. In some implementations, the operations can include estimating, based on the first data and the updated second data, a metric indicative of expected profits to be realized by a provider of the wireless network, the expected profits associated with at least one of the multiple users. In some implementations, the operations can include selecting, based on the first data and the updated second data, (i) a candidate location for a retail location or (ii) a candidate location for wireless network infrastructure.

In another aspect, one or more machine-readable storage devices are featured. The one or more machine-readable storage devices have encoded thereon computer readable instructions for causing one or more processing devices to perform operations. The operations include receiving first data indicative of network usage of multiple users of a wireless network, wherein the first data includes information representing sequences of wireless cells that are connected to by user devices of the multiple users. The operations also include receiving second data indicative of one or more locations of a set of wireless cells, the set of wireless cells including at least a portion of the wireless cells that are connected to by the user devices of the multiple users. The operations also include identifying, using one or more machine learning models, a portion of the one or more locations that are likely to be incorrect based on the first data and the second data. The operations also include generating estimates of a revised location for each wireless cell corresponding to the identified portion of the one or more locations that are likely to be incorrect, wherein the estimates are generated by one or more additional machine learning models. The operations also include updating the second data to include the generated estimates.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the one or more additional machine learning models can include a neural network trained using examples of wireless cell locations with artificially introduced noise. In some implementations, the one or more machine learning models can be trained to perform a classification task and the one or more additional machine learning models can be trained to perform a regression task. In some implementations, the operations can include determining a primary work location or a primary residence location for at least one of the multiple users based on the first data and the updated second data. In some implementations, the operations can include attributing demographic information to at least one of the multiple users based on the first data, the updated second data, and demographic information known about one or more geographic locations. In some implementations, the operations can include estimating, based on the first data and the updated second data, a metric indicative of expected profits to be realized by a provider of the wireless network, the expected profits associated with at least one of the multiple users. In some implementations, the operations can include selecting, based on the first data and the updated second data, (i) a candidate location for a retail location or (ii) a candidate location for wireless network infrastructure.

In another aspect, one or more non-transitory machine-readable storage media are featured. The one or more non-transitory machine-readable storage media have encoded thereon computer readable instructions for causing one or more processing devices to perform operations. The operations include receiving first data indicative of network usage of multiple users of a wireless network, wherein the first data includes information representing sequences of wireless cells that are connected to by user devices of the multiple users. The operations also include receiving second data indicative of one or more locations of a set of wireless cells, the set of wireless cells including at least a portion of the wireless cells that are connected to by the user devices of the multiple users. The operations also include identifying at least one wireless cell that is represented in the first data but does not have a corresponding location included in the second data, and generating, by one or more machine learning models, an estimated location for the at least one wireless cell. The operations also include updating the second data to include the estimated location.

Implementations can include the examples described below and herein elsewhere. In some implementations, the first data indicative of the network usage of the multiple users of the wireless network can include information about times between connections for the sequences of wireless cells that are connected to by the user devices of the multiple users. In some implementations, the first data indicative of the network usage of the multiple users of the wireless network can include information about alleged distances between one or more wireless cells in the sequences of wireless cells that are connected to by the user devices of the multiple users. In some implementations, the one or more machine learning models can include a neural network trained using examples of wireless cell locations with artificially introduced noise. In some implementations, the operations can include determining a primary work location or a primary residence location for at least one of the multiple users based on the first data and the updated second data. In some implementations, the operations can include attributing demographic information to at least one of the multiple users based on the first data, the updated second data, and demographic information known about one or more geographic locations. In some implementations, the operations can include estimating, based on the first data and the updated second data, a metric indicative of expected profits to be realized by a provider of the wireless network, the expected profits associated with at least one of the multiple users. In some implementations, the operations can include selecting, based on the first data and the updated second data, (i) a candidate location for a retail location or (ii) a candidate location for wireless network infrastructure.

Various implementations of the technology described herein may provide one or more of the following advantages. The techniques described herein can improve the completeness and quality of datasets (e.g., "messy" crowd-sourced datasets) that map out the locations of wireless equipment such as cells. In addition, by providing the localization of wireless equipment with increased accuracy, the techniques described herein allow session-level data about wireless users to be utilized more effectively to determine information about the users such as their primary residence location and/or their primary work location based on their data usage patterns (e.g., which cells in the network the user connects to at different times in the day). Moreover, the accurate localization of wireless equipment can enable one to correlate the location of the wireless equipment to demographic information about the area (e.g., a "micro-neighborhood") where the wireless equipment is located. This demographic information (e.g., an age distribution for the area, an average income for the area, etc.) can in turn be used for a variety of applications such as estimating the potential profitability of attaining (or retaining) customers in the area, making decisions about where to install additional wireless equipment, making decisions about where to open a retail location (e.g., a location where data plans are sold), etc. Examples and implementation details of such techniques are provided, for example, in U.S. patent application Ser. No. 18/533,045 filed on Dec. 7, 2023, U.S. patent application Ser. No. 18/533,051 filed on Dec. 7, 2023, U.S. patent application Ser. No. 18/533,057 filed on Dec. 7, 2023, and U.S. patent application Ser. No. 18/533,070 filed on Dec. 7, 2023, all of which are hereby incorporated by reference in their entirety.

Other features and advantages of the description will become apparent from the following description, and from the claims. Unless otherwise defined, the technical and scientific terms used herein have the same meaning as commonly understood by one of ordinary skill in the art to which this invention belongs.

BRIEF DESCRIPTION OF DRAWINGS

FIG. 2 shows an example data structure that includes network usage data.

FIG. 3 shows an example data structure that includes the alleged locations of wireless equipment.

DETAILED DESCRIPTION

Figure 1:
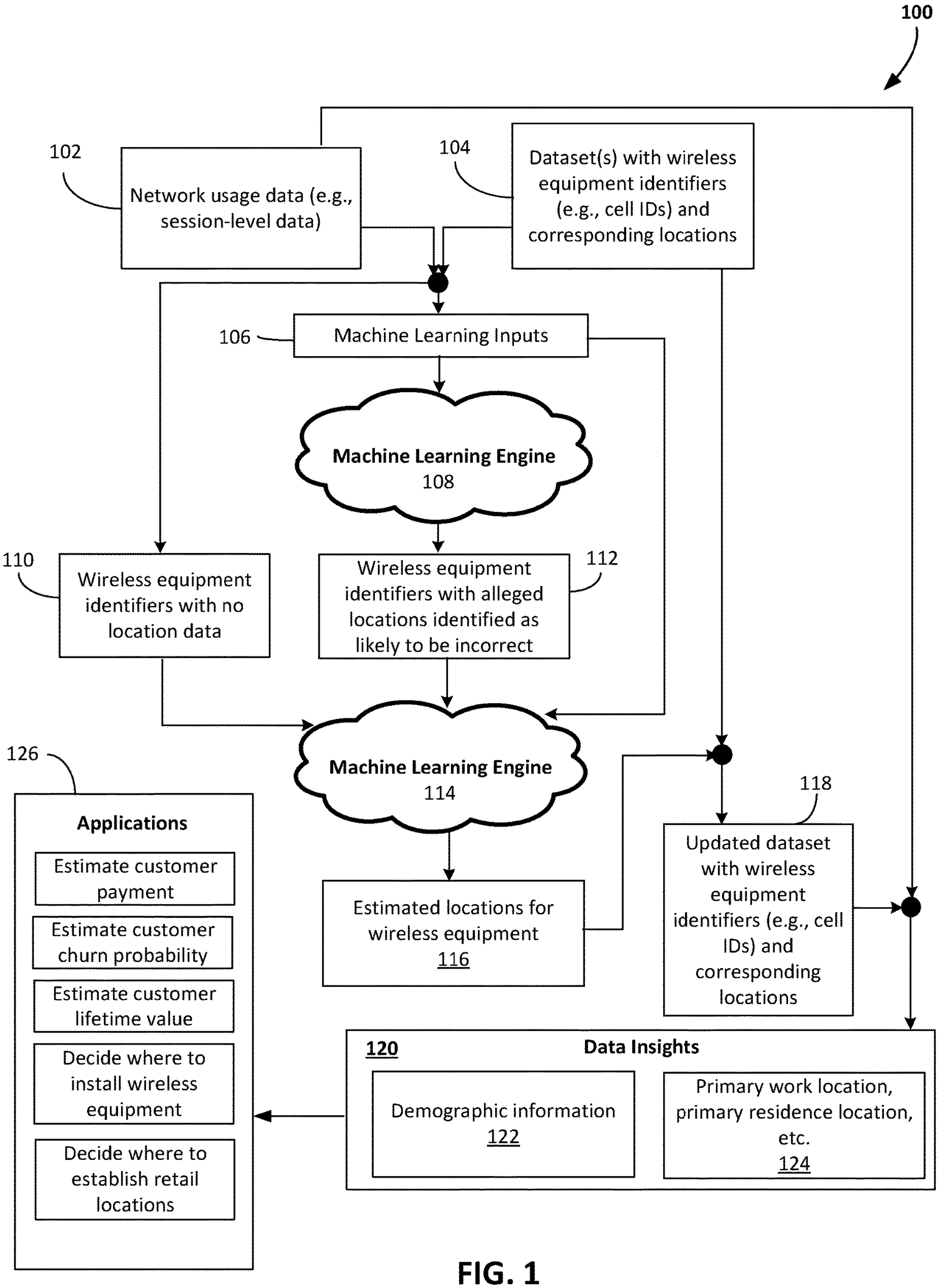
FIG. 1 illustrates a data flow for localizing wireless equipment and utilizing wireless equipment location data for various applications.

Referring to FIG. 1, a data flow 100 is shown. The data flow 100 can be used, for example, by a cellular network provider for localizing wireless equipment and utilizing wireless equipment location data for various applications. In some cases, the wireless equipment can include wireless cells (sometimes referred to simply as "cells"), which are devices that send, receive, and/or process wireless signals across the cellular network (e.g., a 4G network, a 5G network, etc.). These cells can be installed at wireless towers distributed throughout a geographic area to provide cellular network coverage to the geographic area.

Users of the cellular network can connect to the cellular network via user devices (e.g., mobile phones, tablets, laptops, computers, etc.) to access the network and to transmit and/or receive data through the network. For example, users can pay a provider of the cellular network (e.g., in accordance with a data plan or contract) to use a certain amount data (including unlimited data) on the network. When a user connects to the cellular network, a data session (sometimes referred to herein simply as a "session") is started, and session-level data about the user's activity during the session can be collected and stored as part of network usage data 102. In particular, throughout a single data session, the user device of the user may connect to different cells within the cellular network (e.g., as the user travels), and information about these cells can be stored as part of the network usage data 102. The network usage data 102 can be accessed by the cellular network provider and can aggregate the session-level data from multiple users and from one or more sessions corresponding to the multiple users.

An example data structure 200 for the network usage data 102 is shown in FIG. 2. The data structure 200 is a matrix, in which each column represents a particular session, and each row represents session characteristics such as cell IDs (e.g., a list or vector of cell IDs that each correspond to a particular cell that was connected to by the user device during the session), the time between connections to different cells, the distance between cells (e.g., the distance between cells that are consecutively connected to by the user device), etc. In some implementations, the sessions that make up the columns of the data structure 200 can include multiple data sessions from a single user as well as data sessions from multiple distinct users. Moreover, while the data structure 200 is shown as a matrix, in some implementations, other data structures such as vectors, arrays, hashmaps, etc. can be used to store similar data.

In some cases, the network usage data 102 (and correspondingly, the data structure 200) does not include a location (e.g., a longitude, latitude, other coordinates, etc.) of the cells that are connected to during each session. In such cases, a cellular network provider cannot determine the physical locations of the relevant cells based on the network usage data 102 (or the data structure 200) alone. Instead, to determine the physical locations of the cells, the network usage data 102 must be cross-referenced with one or more other datasets (e.g., dataset(s) 104 shown in FIG. 1) that include wireless equipment identifiers (e.g., cell IDs) and their corresponding locations. Importantly, however, the dataset(s) 104 might not be created or maintained by the cellular network provider. Instead, the dataset(s) 104 might be independently created and/or maintained by another party.

An example data structure 300 for the dataset(s) 104 is shown in FIG. 3. The data structure 300 is a matrix, in which each row represents a particular cell (identified by a unique cell ID), and at least a portion of the columns represent location characteristics such as latitude or longitude. In some implementations, other cell characteristics can be stored in the data structure 300 such as a model type of the cell, an installation date of the cell, an elevation of the cell, etc. While the data structure 300 is shown as a matrix, in some implementations, other data structures such as vectors, arrays, hashmaps, etc. can be used to store similar data. In addition, in some implementations, the data structure 300 can also be modified such that the columns can represent the different cells and the rows represent the cell characteristics.

Datasets that include wireless equipment identifiers (e.g., cell IDs) and corresponding locations—such as the dataset(s) 104—can be commercially available (e.g., on a subscription basis) or can be open-sourced. While commercially available datasets may be more accurate and reliable than open-source datasets (e.g., open-source datasets created through crowdsourcing), commercially available datasets can also be more expensive to access. On the other hand, open-source datasets are currently available for free and can be created automatically using software installed on user devices, which enables the users of a cellular network to voluntarily contribute cell IDs and locations to the crowdsourced datasets. An example of an open-source dataset that includes wireless equipment identifiers and corresponding locations is "OpenCelliD," which is a crowdsourced dataset available at https://opencellid.org.

Despite being more easily and/or more affordably accessible than commercially available datasets, crowdsourced datasets can have disadvantages such as substantial amounts of missing data (e.g., cell IDs for which no location is provided) and/or inaccurate data (e.g., cell IDs for which inaccurate locations are provided). This missing data and/or inaccurate data can be attributed to a number of potential causes including write-in issues, misuse of the data contribution software, software bugs, hardware issues, hardware positioning, etc. Thus, when working with the dataset(s) 104—especially crowdsourced datasets—it is important to be able to (i) identify when the alleged locations of the wireless equipment in the dataset(s) 104 is likely to be incorrect, and (ii) generate an accurate estimate for the location of the wireless equipment when the alleged location of the wireless equipment in the dataset(s) 104 is likely to be incorrect or is missing entirely. The techniques disclosed herein provide solutions for addressing each of these challenges.

Referring again to FIG. 1, the network usage data 102 and the dataset(s) with wireless equipment identifiers and corresponding locations 104 can be jointly analyzed (or in some cases, the dataset(s) 104 can be analyzed alone) to identify wireless equipment identifiers with no location data 110. For example, these can be cell IDs for which there is missing location data in the dataset(s) 104, and in some implementations, might be more specifically limited to the subset of cell IDs in the dataset(s) 104 that also appear in the network usage data 102.

Separate from identifying wireless equipment identifiers with no location data 110, the data flow 100 also includes identifying wireless equipment identifiers with alleged locations identified as likely to be incorrect 112. For example, these can be cell IDs for which the location data (e.g., the alleged location of the cell) is likely to be incorrect. In the data flow 100, the wireless equipment identifiers with alleged locations identified as likely to be incorrect 112 are identified using a machine learning process.

The machine learning process includes receiving the network usage data 102 and the dataset(s) with wireless equipment identifiers and corresponding locations 104, and then using the network usage data 102 and/or the dataset(s) 104 to derive machine learning inputs 106, which can be input to a machine learning engine 108. For example, in some cases, the network usage data 102 can be merged or concatenated with the dataset(s) 104 based on the wireless equipment identifiers (e.g., cell IDs) included in the data structures 200 and 300 (shown in FIGS. 2 and 3, respectively). In this way, the network usage data 102 can be supplemented to include wireless equipment location data (e.g., location data for the wireless cells connected to during various data sessions) that was not originally included in the data structure 200.

The resulting dataset supplemented with location data can then be used to derive machine learning inputs 106 to train one or more machine learning models implemented on the machine learning engine 108 and to cause the machine learning engine 108—once the one or more machine learning models implemented on it have been trained—to classify cell IDs in the network usage data 102 and/or the dataset(s) 104 as wireless equipment identifiers with alleged locations identified as likely to be incorrect 112. In particular, the one or more machine learning models implemented on the machine learning engine 108 can be trained such that, for any cell ID of interest, the machine learning engine 108 can analyze the machine learning inputs 106 to classify whether the alleged location of the cell ID in the dataset(s) 104 (or in the dataset supplemented with location data) is likely to be correct or incorrect.

In one example, to derive the machine learning inputs 106, the dataset supplemented with location data can be manipulated into a single vector (e.g., a feature vector) that represents the cell ID of interest, the alleged location of the cell corresponding to the cell ID of interest, time-series information about the sequence of cell IDs connected to prior to and/or subsequently to the cell ID of interest in various data sessions, the alleged locations corresponding to these cell IDs, the time between consecutive cell connections, the distance between cells that are connected to in various data sessions, etc. Based on this information, the machine learning engine 108—once the one or more machine learning models implemented on it have been trained—can identify whether the alleged location of the cell corresponding the cell ID of interest is likely to be correct or incorrect. For example, if the machine learning inputs 106 indicate that, in one or more user sessions, a user is travelling at a steady speed of approximately 30 miles per hour within Houston, Texas and proceeds to suddenly connect to a cell ID of interest that is allegedly located in Boston, Massachusetts seconds later, then the one or more machine learning models implemented on the machine learning engine 108 can be trained to identify that the cell ID of interest is likely to be incorrect and is not actually located in Boston, Massachusetts. The machine learning engine 108 can then flag the cell ID of interest that is allegedly located in Boston, Massachusetts as a wireless equipment identifier with an alleged location identified as likely to be incorrect 112.

In some implementations, the machine learning engine 108 can include the implementation of one or more machine learning models that employ one or more techniques including decision trees, linear regression, neural networks, multinomial logistic regression, Naive Bayes (NB), trained Gaussian NB, NB with dynamic time warping, multiple linear regression, Shannon entropy, support vector machine (SVM), one versus one support vector machine, k-means clustering, Q-learning, temporal difference (TD), neural networks, deep adversarial networks, and the like. In some implementations, neural networks can have the advantage of being particularly suitable for time series analyses and can be well-suited to operate on large, time-series vectors such as those included in the network usage data 102.

One challenge with training the one or more machine learning models implemented on the machine learning engine 108 to identify cells having incorrect location data is that it might not be known a priori which cell locations included in the dataset(s) 104 are incorrect. To overcome this challenge, the one or more machine learning models implemented on the machine learning engine 108 can be trained by intentionally introducing artificial noise into the dataset(s) 104, which can then be used as part of the training data. For example, the dataset(s) with wireless equipment identifiers and corresponding locations 104 can be intentionally modified by swapping the locations of various wireless equipment identifiers (e.g., cell IDs) included in the dataset(s) 104. This modified dataset can then be combined with the network usage data 102 and used to derive a training dataset with machine learning inputs 106 that are used to train the one or more machine learning models implemented on the machine learning engine 108. By introducing artificial noise into the training data, a person training the one or more machine learning models implemented on the machine learning engine 108 will be aware of at least some of the (intentionally introduced) incorrect cell locations included in the training data. Knowing that at least these cell locations (and their corresponding cell IDs) should be identified by the machine learning engine 108, a supervised learning process can then be conducted. Once the one or more machine learning models implemented on the machine learning engine 108 are trained according to this process, the machine learning engine 108 is not only able to identify the intentionally introduced cell location errors included in the dataset(s) 104, but also previously unknown inaccuracies in the dataset(s) 104.

Once the wireless equipment identifiers with no location data 110 and the wireless equipment identifiers with alleged locations identified as likely to be incorrect 112 have been identified, they can be input to another machine learning engine 114 along with additional machine learning inputs derived from the network usage data 102 and the dataset(s) with wireless equipment identifiers and corresponding locations 104. For example, as shown in the data flow 100, the machine learning inputs received by the machine learning engine 114 can be the same or substantially similar (e.g., having a substantially similar format) to the machine learning inputs 106 described above. Like the machine learning engine 108, the machine learning engine 114 can include the implementation of one or more machine learning models that employ one or more techniques including decision trees, linear regression, neural networks, multinomial logistic regression, Naive Bayes (NB), trained Gaussian NB, NB with dynamic time warping, multiple linear regression, Shannon entropy, support vector machine (SVM), one versus one support vector machine, k-means clustering, Q-learning, temporal difference (TD), neural networks, deep adversarial networks, and the like.

The one or more machine learning models implemented on the machine learning engine 114 can be trained to process the machine learning inputs 106 along with (i) the wireless equipment identifiers with no location data 110 and/or (ii) the wireless equipment identifiers with alleged locations identified as likely to be incorrect 112 to generate estimated locations for the wireless equipment 116 (e.g., an estimated location for each cell identified among the wireless equipment identifiers with missing or inaccurate location data). In particular, the one or more machine learning models implemented on the machine learning engine 114 can be trained using a similar training set as that described above in relation to training the one or more machine learning models implemented on the machine learning engine 108 (e.g., including the intentional introduction of artificial noise). However, while the one or more machine learning models implemented on the machine learning engine 108 are trained to perform a classification task (e.g., identifying which cells are likely to have inaccurate corresponding location data), the one or more machine learning models implemented on the machine learning engine 114 are trained to perform a regression task. That is, the one or more machine learning models implemented on the machine learning engine 114 are trained to estimate, for each cell of interest (e.g., cells with missing or inaccurate corresponding location data), an accurate corresponding location. By intentionally introducing artificial noise into the training data (e.g., by swapping a portion of the cell locations), a person training the one or more machine learning models implemented on the machine learning engine 114 will be aware of at least some of the (intentionally introduced) incorrect cell locations included in the training data as well as their true locations. Based on this knowledge of the true locations of these cells, a supervised learning process can then be conducted to evaluate and improve the accuracy of the estimated locations generated by the machine learning engine 114.

While FIG. 1 shows two separate machine learning engines (e.g., machine learning engine 108 and machine learning engine 114) to clearly illustrate the different purposes served by the machine learning models implemented on each engine, in some cases, the machine learning models implemented on the machine learning engines 108, 114 can all be implemented on a single machine learning engine.

To understand the regression task performed by the machine learning engine 114, consider a data session for which the network usage data 102 and the location data from the dataset(s) 104 indicate that a user is traveling approximately thirty miles per hour eastward within Houston, Texas; suddenly connects to a cell alleged to be in Boston, Massachusetts; and then, within minutes, proceeds to again connect to cells in Houston, Texas while continuing to move eastward at thirty miles per hour. While the one or more machine learning models implemented on the machine learning engine 108 can be trained to identify that the location data for the cell alleged to be in Boston, Massachusetts is likely to be incorrect, the one or more machine learning models implemented on the machine learning engine 114 can be trained to provide a more accurate location estimate for the identified cell of interest. Based on the data session information described in this example, the machine learning engine 114 might estimate that the cell of interest is actually located in Houston, Texas, e.g., somewhere between the locations of the cells that the user device connected to immediately before and after connecting to the cell of interest. More specifically, based on the timings and distances between cell connections, the machine learning engine 114 might interpolate the location of the cell of interest based on the speed and heading of the user device (e.g., thirty miles per hour eastward) just before and just after connecting to the cell of interest. This example is intended to be a simple illustration of how the estimated locations for wireless equipment 116 can be output by the machine learning engine 114 by analyzing a single data session. However, at scale, the machine learning engine 114 can simultaneously process a large number of data sessions included in the network usage data 102 (e.g., 10,000 data sessions, 50,000 data sessions, 100,000 data sessions, 500, 000 data sessions, etc.) to produce even more accurate location estimates. For example, if one hundred thousand data sessions include user device connections to the cell of interest by various users headed in different directions and at different speeds, a much more reliable and accurate estimate of the cell's location can be produced compared to relying on a single data session alone. In this way, the machine learning engine 114 is able to identify patterns within and utilize large amounts of session-level data in ways that could not be practically performed by a human.

Once trained, the one or more machine learning models implemented on the machine learning engine 114 can process the machine learning inputs 106 to produce estimated locations for wireless equipment 116 (e.g., cell locations) for any and/or all of the wireless equipment identified as having missing or inaccurate location data (e.g., wireless equipment corresponding to the wireless equipment identifiers with no location data 110 and/or the wireless equipment identifiers with alleged locations identified as likely to be incorrect 112). The estimated locations for wireless equipment 116 output by the machine learning engine 114 can then be used to overwrite and/or fill in location entries in the dataset(s) 104 to produce an updated dataset with wireless equipment identifiers and corresponding locations 118.

The updated dataset with wireless equipment identifiers and corresponding locations 118 can be used for a variety of purposes. For example, the updated dataset 118 can be merged, concatenated, and/or jointly analyzed with the network usage data 102 to provide data insights 120. To the extent that the data insights 120 rely on accurate location data of wireless equipment in the cellular network, using the updated dataset 118 can provide much more reliable results than the original dataset(s) 104. Examples of location-related data insights 120 that can be derived from the updated dataset 118 and the network usage data 102 include the identification of demographic information 122 and/or the identification of a primary work location, primary residence location, etc. 124.

With respect to data insights on demographic information 122, the updated dataset 118 and the network usage data 102 can be cross-referenced with one or more pre-existing datasets that include demographic data for various geographic areas (e.g., "microneighborhoods"). These datasets (many of which are commercially available) can include information such as an age distribution for each area, the distribution of household income for each area, the proportion of people who rent versus own homes, the proportion of people who own cars, etc. While the boundaries of the geographic areas in such datasets might not match up exactly with the coverage zones of various localized wireless cells, the demographic data included in these datasets can be mapped onto specific wireless cell locations, for example, using weighted averaging techniques that average the demographic data for multiple geographic areas that fall within the coverage area of each wireless cell. In this way, a demographic profile for a particular cell can be derived.

With respect to identifying a primary work location, primary residence location, etc. 124, this can be accomplished by analyzing the timing and patterns of data sessions in the network usage data 102 supplemented by cell locations from the updated dataset 118. For example, if it is identified that a particular user of the cellular network tends to spend evenings and weekends connected to wireless cells based in Somerville, Massachusetts, it can be inferred that this is his primary residence location. Likewise, if it is identified that the same user of the cellular network tends to spend weekday mornings and afternoons connected to wireless cells based in Framingham, MA, it can be inferred that this is his primary work location. Based on identifying a primary work location and a primary residence location, the network usage data 102 can further be analyzed to determine usage patterns associated with each of these locations. For example, it could be observed that a user tends to use much more wireless data when at his primary residence location compared to when he is at his primary work location.

Data insights 120 such as demographic information 122 and primary work location, primary residence location, etc. 124 can in turn be used (e.g., by a cellular network provider) for a number of applications 126. These applications 126 can include estimating customer payments for a particular user, estimating a customer churn probability, estimating a customer lifetime value for a particular user, deciding where to install wireless equipment to improve/expand network coverage, deciding where to establish retail locations to acquire additional users of the cellular network, etc. Examples of these applications are described, for example, in U.S. patent application Ser. No. 18/533,045 filed on Dec. 7, 2023, U.S. patent application Ser. No. 18/533,051 filed on Dec. 7, 2023, U.S. patent application Ser. No. 18/533,057 filed on Dec. 7, 2023, and U.S. patent application Ser. No. 18/533,070 filed on Dec. 7, 2023, each of which is hereby incorporated by reference in its entirety.

Figure 4:
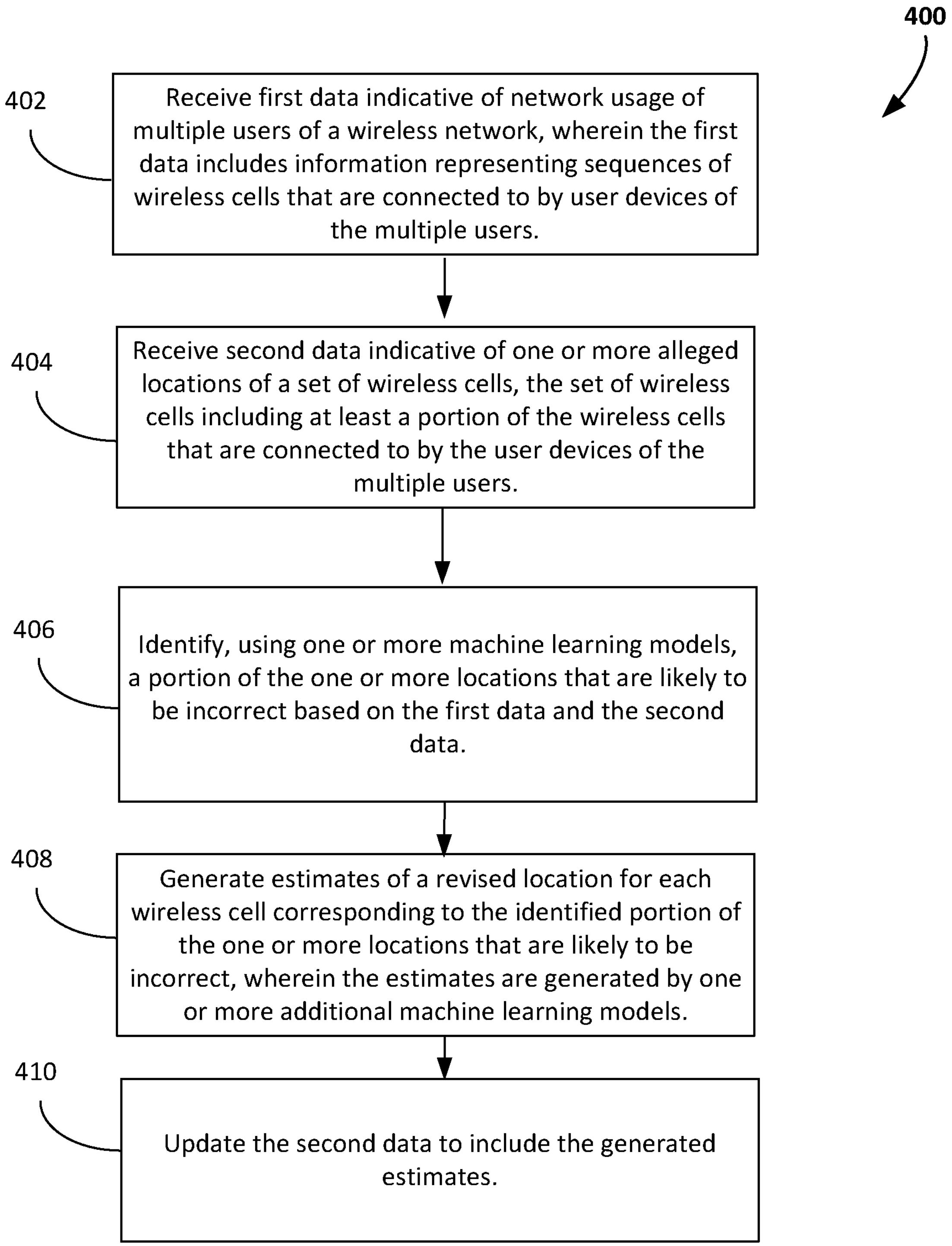
FIGS. 4-5 are flowcharts showing example processes for revising datasets that include the alleged locations of wireless equipment.

FIG. 4 illustrates an example process 400 for revising a dataset that includes the alleged locations of wireless equipment (e.g., revising the dataset(s) 104 to create the updated dataset 118 shown in FIG. 1). In some implementations, operations of the process 400 can be executed by a computing device or mobile computing device such as those described below in relation to FIG. 6.

Operations of the process 400 include receiving first data indicative of network usage of multiple users of a wireless network, wherein the first data includes information representing sequences of wireless cells that are connected to by user devices of the multiple users (402). For example, the first data can correspond to the network usage data 102 shown in FIG. 1, which includes session-level data about the data sessions of multiple users of a wireless network (e.g., a 4G or 5G network). As described above, the network usage data 102 can be implemented using the data structure 200 shown in FIG. 2, and the sequences of wireless cells that are connected to by user devices in step 402 can correspond to the sequences of cell IDs stored in the data structure 200. In some implementations, the first data indicative of the network usage of the multiple users of the wireless network further includes information about times between connections for the sequences of wireless cells that are connected to by the user devices of the multiple users (e.g., the "Time Between Connections" shown in data structure 200). In some implementations, the first data indicative of the network usage of the multiple users of the wireless network further includes information about alleged distances between one or more wireless cells in the sequences of wireless cells that are connected to by the user devices of the multiple users (e.g., the "Distance Between Cells" shown in data structure 200).

Operations of the process 400 also include receiving second data indicative of one or more alleged locations of a set of wireless cells, the set of wireless cells including at least a portion of the wireless cells that are connected to by the user devices of the multiple users (404). For example, the second data can correspond to the dataset(s) 104 described in relation to FIG. 1, which include wireless equipment identifiers (e.g., cell IDs) and their alleged corresponding locations.

Operations of the process 400 also include identifying, using one or more machine learning models, a portion of the one or more locations that are likely to be incorrect based on the first data and the second data (406). For example, the one or more machine learning models can correspond to one or more machine learning models implemented on the machine learning engine 108 described above in relation to FIG. 1. As described above, in some implementations, the one or more machine learning models can include a neural network trained using examples of wireless cell locations with artificially introduced noise. The one or more machine learning models can be trained to perform a classification task (e.g., identifying, for a particular cell, whether the corresponding location data in the dataset(s) 104 is likely to be incorrect).

Operations of the process 400 also include generating estimates of a revised location for each wireless cell corresponding to the identified portion of the one or more locations that are likely to be incorrect, wherein the estimates are generated by one or more additional machine learning models (408). The one or more additional machine learning models can correspond to one or more machine learning models implemented on the machine learning engine 114 described above and the generated estimates can correspond to the estimated locations for wireless equipment 116 shown in FIG. 1. The identified portion of the one or more locations that are likely to be incorrect can correspond to locations in the dataset(s) 104 associated with the wireless equipment identifiers 112 (e.g., wireless equipment identifiers with alleged locations identified as likely to be incorrect). As described previously, in some implementations, the one or more additional machine learning models can include a neural network trained using examples of wireless cell locations with artificially introduced noise. The one or more additional machine learning models can be trained to perform a regression task (e.g., estimating locations for wireless cells).

Operations of the process 400 also include updating the second data to include the generated estimates (410). For example, as shown in the data flow 100, the step 410 can correspond to the generation of the updated dataset 118 based on updating the dataset(s) 104 with the estimated locations for wireless equipment 116.

Additional operations of the process 400 can include the following. In some implementations, the process 400 can include determining a primary work location or a primary residence location for at least one of the multiple users based on the first data and the updated second data (e.g., primary work location, primary residence location, etc. 124 shown in FIG. 1). In some implementations, the process 400 can include attributing demographic information (e.g., demographic information 122 shown in FIG. 1) to at least one of the multiple users based on the first data, the updated second data, and demographic information known about one or more geographic locations. In some implementations, the process 400 can include estimating, based on the first data and the updated second data, a metric indicative of expected profits to be realized by a provider of the wireless network, the expected profits associated with at least one of the multiple users. For example, this metric can be estimated customer payments for a particular customer of the wireless network provider, a customer churn probability, a customer lifetime value, etc. In some implementations, the process 400 can include selecting, based on the first data and the updated second data, (i) a candidate location for a retail location or (ii) a candidate location for wireless network infrastructure.

Figure 5:
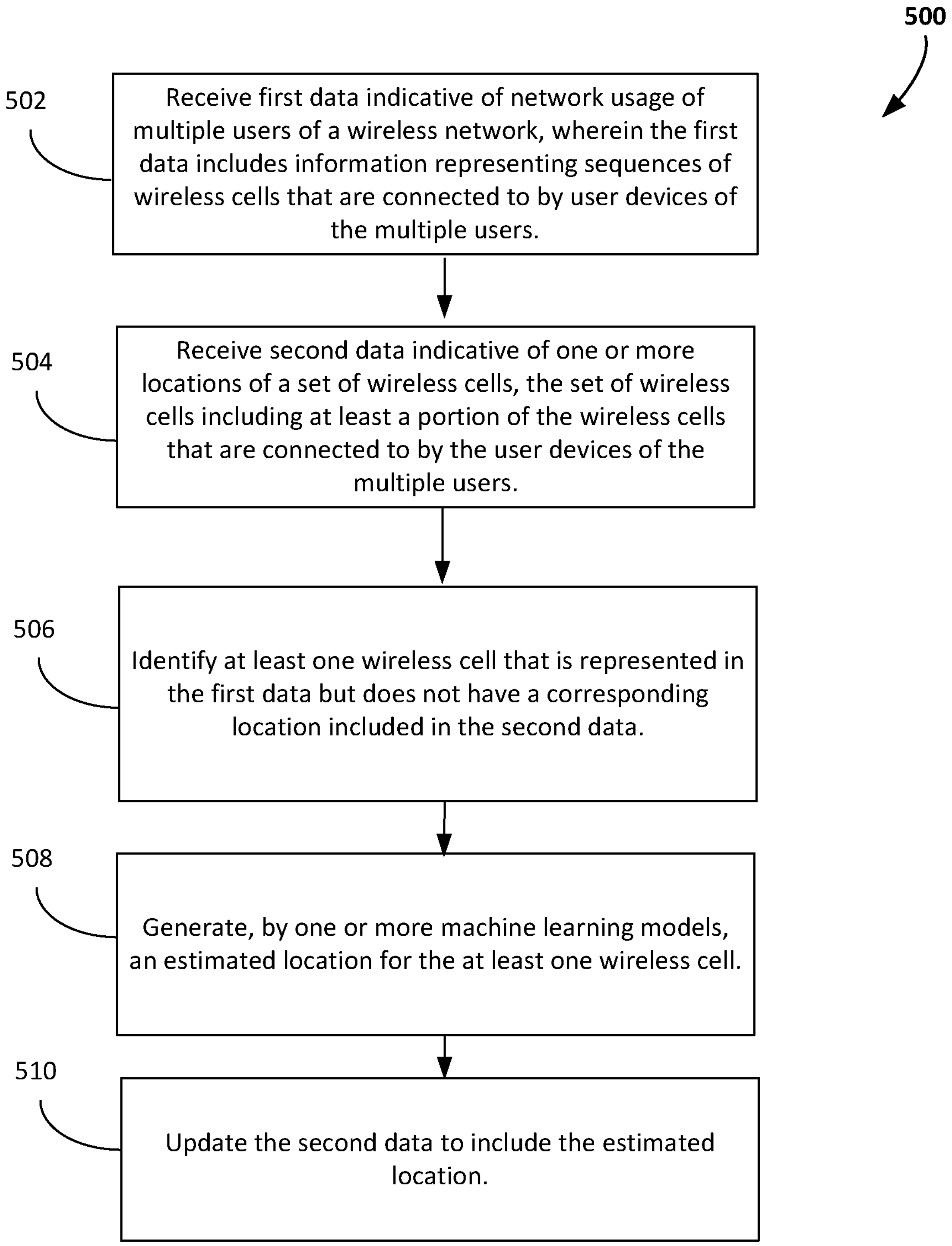

FIG. 5 illustrates another example process 500 for revising a dataset that includes the alleged locations of wireless equipment (e.g., revising the dataset(s) 104 to create the updated dataset 118 shown in FIG. 1). In some implementations, operations of the process 500 can be executed by a computing device or mobile computing device such as those described below in relation to FIG. 6.

Operations of the process 500 include receiving first data indicative of network usage of multiple users of a wireless network, wherein the first data includes information representing sequences of wireless cells that are connected to by user devices of the multiple users (502). For example, the first data can correspond to the network usage data 102 shown in FIG. 1, which includes session-level data about the data sessions of multiple users of a wireless network (e.g., a 4G or 5G network). As described above, the network usage data 102 can be implemented using the data structure 200 shown in FIG. 2, and the sequences of wireless cells that are connected to by user devices in step 502 can correspond to the sequences of cell IDs stored in the data structure 200. In some implementations, the first data indicative of the network usage of the multiple users of the wireless network further includes information about times between connections for the sequences of wireless cells that are connected to by the user devices of the multiple users (e.g., the "Time Between Connections" shown in data structure 200). In some implementations, the first data indicative of the network usage of the multiple users of the wireless network further includes information about alleged distances between one or more wireless cells in the sequences of wireless cells that are connected to by the user devices of the multiple users (e.g., the "Distance Between Cells" shown in data structure 200).

Operations of the process 500 also include receiving second data indicative of one or more locations of a set of wireless cells, the set of wireless cells including at least a portion of the wireless cells that are connected to by the user devices of the multiple users (504). For example, the second data can correspond to the dataset(s) 104 described in relation to FIG. 1, which include wireless equipment identifiers (e.g., cell IDs) and their alleged corresponding locations.

Operations of the process 500 also include identifying at least one wireless cell that is represented in the first data but does not have a corresponding location included in the second data (506). For example, the at least one wireless cell that is represented in the first data but does not have a corresponding location included in the second data can correspond to the wireless equipment identifiers 110 shown in FIG. 1 (e.g., wireless equipment identifiers with no location data).

Operations of the process 500 also include generating, by one or more machine learning models, an estimated location for the at least one wireless cell (508). The one or more machine learning models can correspond to one or more machine learning models implemented on the machine learning engine 114 described above and the generated location estimates can correspond to the estimated locations for wireless equipment 116 shown in FIG. 1. As described previously, in some implementations, the one or more machine learning models can include a neural network trained using examples of wireless cell locations with artificially introduced noise. The one or more machine learning models can be trained to perform a regression task (e.g., estimating locations for wireless cells).

Operations of the process 500 also include updating the second data to include the estimated location (510). For example, as shown in data flow 100, the step 510 can correspond to the generation of the updated dataset 118 based on updating the dataset(s) 104 with the estimated locations for wireless equipment 116.

Additional operations of the process 500 can include the following. In some implementations, the process 500 can include determining a primary work location or a primary residence location for at least one of the multiple users based on the first data and the updated second data (e.g., primary work location, primary residence location, etc. 124 shown in FIG. 1). In some implementations, the process 500 can include attributing demographic information (e.g., demographic information 122 shown in FIG. 1) to at least one of the multiple users based on the first data, the updated second data, and demographic information known about one or more geographic locations. In some implementations, the process 500 can include estimating, based on the first data and the updated second data, a metric indicative of expected profits to be realized by a provider of the wireless network, the expected profits associated with at least one of the multiple users. For example, this metric can be estimated customer payments for a particular customer of the wireless network provider, a customer churn probability, a customer lifetime value, etc. In some implementations, the process 500 can include selecting, based on the first data and the updated second data, (i) a candidate location for a retail location or (ii) a candidate location for wireless network infrastructure.

Figure 6:
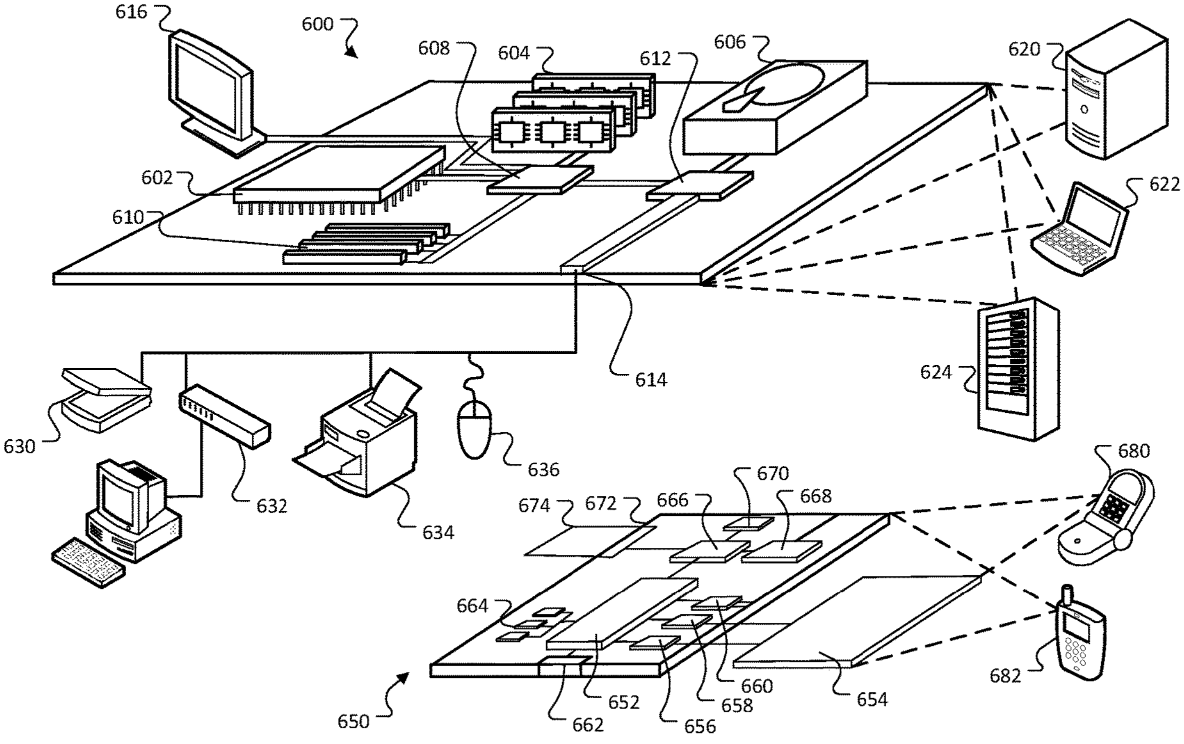
FIG. 6 is a diagram illustrating an example of a computing environment.

FIG. 6 shows an example of a computing device 600 and a mobile computing device 650 that are employed to execute implementations of the present disclosure. For example, the computing device 600 and/or the mobile computing device can be employed to execute the processes 400 and 500. The mobile computing device 650 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 600 includes a processor 602, a memory 604, a storage device 606, a high-speed interface 608, and a low-speed interface 612. In some implementations, the high-speed interface 608 connects to the memory 604 and multiple high-speed expansion ports 610. In some implementations, the low-speed interface 612 connects to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 and/or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of a computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 602, perform one or more methods, such as those described above. The instructions can also be stored by one or more storage devices, such as computer-readable or machine-readable mediums, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 614 through a network adapter. Such network input/output devices may include, for example, a switch or router.

The computing device 600 may be implemented in a number of different forms, as shown in FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652; a memory 664; an input/output device, such as a display 654; a communication interface 666; and a transceiver 668; among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate. In some implementations, the mobile computing device 650 may include a camera device(s).

The processor 652 can execute instructions within the mobile computing device 650, including instructions stored in the memory 664. The processor 652 may be implemented as a chipset of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC) processor. The processor 652 may provide, for example, for coordination of the other components of the mobile computing device 650, such as control of user interfaces (UIs), applications run by the mobile computing device 650, and/or wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display, an Organic Light Emitting Diode (OLED) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 652, perform one or more methods, such as those described above. The instructions can also be stored by one or more storage devices, such as one or more computer-readable or machine-readable mediums, such as the memory 664, the expansion memory 674, or memory on the processor 652. In some implementations, the instructions can be received in a propagated signal, such as, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 668 using a radio frequency. In addition, short-range communication, such as using a Bluetooth or Wi-Fi, may occur. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in FIG. 6. For example, it may be implemented a phone device 680, a personal digital assistant 682, and a tablet device (not shown). The mobile computing device 650 may also be implemented as a component of a smart-phone, AR device, or other similar mobile device.

Computing device 600 and/or 650 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:

receiving first data indicative of network usage of multiple users of a wireless network, wherein the first data comprises information representing sequences of wireless cells that are connected to by user devices of the multiple users;

receiving second data indicative of one or more locations of a set of wireless cells, the set of wireless cells comprising at least a portion of the wireless cells that are connected to by the user devices of the multiple users;

identifying, using one or more machine learning models, a portion of the one or more locations having corresponding location data identified as inaccurate by the one or more machine learning models based on the first data and the second data;

generating estimates of a revised location for each wireless cell corresponding to the identified portion of the one or more locations having corresponding location data identified as inaccurate, wherein the estimates are generated by one or more additional machine learning models; and updating the second data to include the generated estimates.

2. The method of claim 1, wherein the first data indicative of the network usage of the multiple users of the wireless network further comprises information about times between connections for the sequences of wireless cells that are connected to by the user devices of the multiple users.

3. The method of claim 1, wherein the first data indicative of the network usage of the multiple users of the wireless network further comprises information about alleged distances between two or more wireless cells in the sequences of wireless cells that are connected to by the user devices of the multiple users.

4. The method of claim 1, wherein the one or more machine learning models comprise a neural network trained using examples of wireless cell locations with artificially introduced noise.

5. The method of claim 1, wherein the one or more additional machine learning models comprise a neural network trained using examples of wireless cell locations with artificially introduced noise.

6. The method of claim 1, wherein the one or more machine learning models are trained to perform a classification task and wherein the one or more additional machine learning models are trained to perform a regression task.

7. The method of claim 1, further comprising determining a primary work location or a primary residence location for at least one of the multiple users based on the first data and the updated second data.

8. The method of claim 1, further comprising attributing demographic information to at least one of the multiple users based on the first data, the updated second data, and demographic information known about one or more geographic locations.

9. The method of claim 1, further comprising estimating, based on the first data and the updated second data, a metric indicative of expected profits to be realized by a provider of the wireless network, the expected profits associated with at least one of the multiple users.

10. The method of claim 1, further comprising selecting, based on the first data and the updated second data, (i) a candidate location for a retail location or (ii) a candidate location for wireless network infrastructure.

11. One or more non-transitory machine-readable storage media storing instructions that when executed by one or more processing devices cause the one or more processing devices to perform operations comprising:

receiving first data indicative of network usage of multiple users of a wireless network, wherein the first data comprises information representing sequences of wireless cells that are connected to by user devices of the multiple users;

receiving second data indicative of one or more locations of a set of wireless cells, the set of wireless cells comprising at least a portion of the wireless cells that are connected to by the user devices of the multiple users;

identifying, using one or more machine learning models, a portion of the one or more locations having corresponding location data identified as inaccurate by the one or more machine learning models based on the first data and the second data;

generating estimates of a revised location for each wireless cell corresponding to the identified portion of the one or more locations having corresponding location data identified as inaccurate, wherein the estimates are generated by one or more additional machine learning models; and updating the second data to include the generated estimates.

* * * * *